United States Patent
Namballa et al.

(10) Patent No.: US 12,094,232 B2
(45) Date of Patent: Sep. 17, 2024

(54) AUTOMATICALLY DETERMINING TABLE LOCATIONS AND TABLE CELL TYPES

(71) Applicant: SAP SE, Walldorf (DE)

(72) Inventors: Richa Namballa, San Jose, CA (US); Jing Wang, Mountain View, CA (US)

(73) Assignee: SAP SE, Walldorf (DE)

( * ) Notice: Subject to any disclaimer, the term of this patent is extended or adjusted under 35 U.S.C. 154(b) by 477 days.

(21) Appl. No.: 17/507,083

(22) Filed: Oct. 21, 2021

(65) Prior Publication Data
US 2023/0126022 A1    Apr. 27, 2023

(51) Int. Cl.
| | |
|---|---|
| *G06V 30/413* | (2022.01) |
| *G06F 18/214* | (2023.01) |
| *G06F 18/24* | (2023.01) |
| *G06N 20/20* | (2019.01) |
| *G06T 7/70* | (2017.01) |
| *G06V 10/94* | (2022.01) |
| *G06V 30/182* | (2022.01) |

(52) U.S. Cl.
CPC .......... *G06V 30/413* (2022.01); *G06F 18/214* (2023.01); *G06F 18/24* (2023.01); *G06N 20/20* (2019.01); *G06T 7/70* (2017.01); *G06V 10/95* (2022.01); *G06V 30/182* (2022.01); *G06T 2207/20081* (2013.01); *G06T 2207/20084* (2013.01); *G06T 2207/30176* (2013.01)

(58) Field of Classification Search
None
See application file for complete search history.

(56) References Cited

U.S. PATENT DOCUMENTS

| | | | |
|---|---|---|---|
| 2015/0193423 A1* | 7/2015 | Folting | G06F 16/00 715/212 |
| 2018/0203836 A1* | 7/2018 | Singh | G06F 40/18 |
| 2020/0019603 A1* | 1/2020 | Zorn | G06N 3/04 |

(Continued)

OTHER PUBLICATIONS

Docs.opencv.org [online], "Contours : Getting Started" Feb. 2020, [retrieved on Oct. 11, 2021], retrieved from: URL <https://docs.opencv.org/3.4/d4/d73/tutorial_py_contours_begin.html>, 2 pages.

(Continued)

*Primary Examiner* — Delomia L Gilliard
(74) *Attorney, Agent, or Firm* — Fish & Richardson P.C.

(57) ABSTRACT

The present disclosure involves systems, software, and computer implemented methods for automatically identifying table locations and table cell types of located tables. One example method includes receiving a request to detect tables. Features are extracted from an input spreadsheet and provided to a trained table detection model trained to predict whether worksheet cells are table cells or background cells and to a cell classification model that is trained to classify worksheet cells by cell structure type. The table detection model generates binary classifications that indicate whether cells are table cells or background cells. A contour detection process is performed on the binary classifications to generate table location information that describes at least one table boundary in the spreadsheet. The trained cell classification model generates a cell structure type classification for each cell that is included in a table boundary generated by the contour detection process.

20 Claims, 15 Drawing Sheets

(56) References Cited

U.S. PATENT DOCUMENTS

| | | |
|---|---|---|
| 2020/0089800 A1 | 3/2020 | Bhojwani et al. |
| 2021/0117839 A1 | 4/2021 | Kulkarni et al. |
| 2021/0117995 A1 | 4/2021 | Kansara et al. |

OTHER PUBLICATIONS

Dong et al., "Tablesense: Spreadsheet table detection with convolutional neural networks." Proceedings of the AAAI Conference on Artificial Intelligence. vol. 33. No. 01, Jul. 2019, 8 pages.

Doush et al., "Detecting and recognizing tables in spreadsheets." Proceedings of the 9th IAPR International Workshop on Document Analysis Systems, Jun. 2010, 8 pages.

Geeksforgeeks.org [online], "Object Detection vs Object Recognition vs Image Segmentation" Feb. 2020, [retrieved on Oct. 11, 2021], retrieved from: URL <https://www.geeksforgeeks.org/object-detection-vs-object-recognition-vs-image-segmentation/>, 9 pages.

Github.com [online], "Annotations Exporter" Apr. 2019, [retrieved on Oct. 11, 2021], retrieved from : URL <https://github.com/ddenron/annotations_exporter>, 2 pages.

He et al., "Mask r-cnn." Proceedings of the IEEE international conference on computer vision, 2017, 12 pages.

Koci et al., "A machine learning approach for layout inference in spreadsheets." IC3K 2016: Proceedings of the 8th International Joint Conference on Knowledge Discovery, Knowledge Engineering and Knowledge Management: vol. 1: KDIR. SciTePress, 2016, 12 pages.

Koci et al., "DECO: A dataset of annotated spreadsheets for layout and table recognition." 2019 International Conference on Document Analysis and Recognition (ICDAR). IEEE, Sep. 2019, 6 pages.

Makarandtapaswi.wordpress.com [online], "Institution behind Average Precision and MAP" Jul. 2012, [retrieved from : URL <https://makarandtapaswi.wordpress.com/2012/07/02/intuition-behind-average-precision-and-map/>, 9 pages.

Ronneberger et al., "U-net: Convolutional networks for biomedical image segmentation." International Conference on Medical image computing and computer-assisted intervention. Springer, Cham, Oct. 2015, 8 pages.

Wikipedia.org [online], "Bootstrap Aggregating" Dec. 2004, [retrieved on Oct. 11, 2021], retrieved from : URL <https://en.wikipedia.org/wiki/Bootstrap_aggregating>, 4 pages.

Wikipedia.org [online], "Precision and Recall" created on Nov. 21, 2007, [retrieved on Oct. 11, 2021], retrieved from: URL <https://en.wikipedia.org/wiki/Precision_and_recall>, 11 pages.

Wwwdb.inf.tu-dresden.de [online], "DeExcelarator" 2013, [retrieved on Oct. 11, 2021], retrieved from: URL <https://wwwdb.inf.tu-dresden.de/misc/DeExcelarator/>, 3 pages.

\* cited by examiner

FIG. 4A

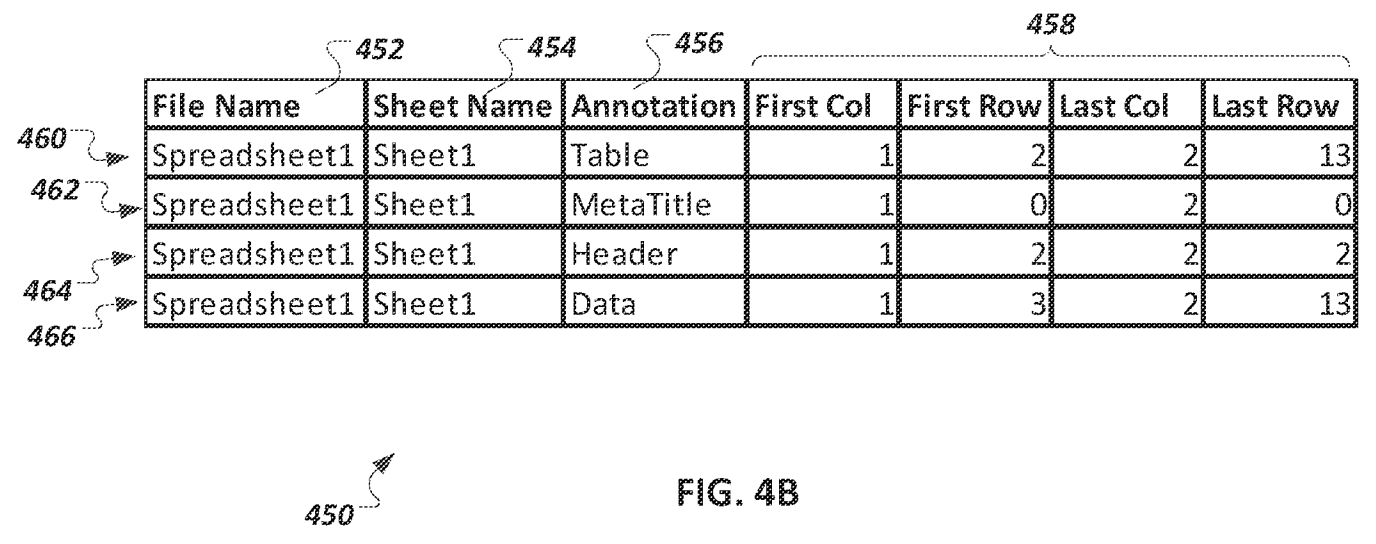

| File Name | Sheet Name | Annotation | First Col | First Row | Last Col | Last Row |
|---|---|---|---|---|---|---|
| Spreadsheet1 | Sheet1 | Table | 1 | 2 | 2 | 13 |
| Spreadsheet1 | Sheet1 | MetaTitle | 1 | 0 | 2 | 0 |
| Spreadsheet1 | Sheet1 | Header | 1 | 2 | 2 | 2 |
| Spreadsheet1 | Sheet1 | Data | 1 | 3 | 2 | 13 |

FIG. 4B

```
"FEATURES": [
  "sheet_index",           504
  "row",                   506
  "col",                   508
  "is_empty",              510
  "str_length",            512
  "is_number",             514
  "is_date",               516
  "is_formula",            518
  "str_number_prop",       520
  "str_letter_prop",       522
  "has_percent_symbol",    524
  "has_decimal_symbol",    526
  "fg_color_r",            528
  "fg_color_g",            530
  "fg_color_b",            532
  "font_color_r",          534
  "font_color_g",          536
  "font_color_b",          538
  "is_font_bold",          540
  "has_top_border",        542
  "has_bottom_border",     544
  "has_left_border",       546
  "has_right_border",      548
  "is_conditional",        550
  "is_merged_h",           552
  "is_merged_v",           554
  "number_of_tokens",      556
  "number_of_leading_spaces", 558
  "starts_with_number",    560
  "starts_with_special_char", 562
  "is_title_case",         564
  "is_upper_case",         566
  "contains_only_alpha",   568
  "contains_special_char", 570
  "contains_colon",        572
  "contains_words_like_total", 574
  "contains_words_like_table", 576
  "indentations",          578
  "default_horizontal_align", 580
  "center_horizontal_align",  582
  "bottom_vertical_align", 584
  "is_wraptext",           586
  "number_of_cells",       588
  "has_thin_top_border",   590
  "has_medium_right_border", 591
  "number_of_defined_borders", 592
  "font_size",             593
  "single_underline",      594
  "has_0_neighbors",       595
  "has_1_neighbors",       596
  "has_2_neighbors",       597
  "has_3_neighbors",
  "has_4_neighbors"]       598
```

{'Spreadsheet1': ⎯⎯ 902
   { 'confidence_score': 0.933, ⎯⎯ 904
906 ⎯⎯ 'table_boundary': (4, 1, 6, 5),
908 ⎯⎯ 'data': [(5, 1),
           (5, 2),
           (5, 3),
           (5, 4)
           (6, 1),
           (6, 2),
           (6, 3),
           (6, 4)],
910 ⎯⎯ 'derived': [(5, 5),
             (6, 5)],
912 ⎯⎯ 'header': [(4, 1),
           (4, 2),
           (4, 3),
           (4, 4),
           (4, 5)]
   }}

AUTOMATICALLY DETERMINING TABLE LOCATIONS AND TABLE CELL TYPES

TECHNICAL FIELD

The present disclosure relates to computer-implemented methods, software, and systems for automatically identifying table locations and table cell types of located tables.

BACKGROUND

Tabular data can be useful for many applications. A table of data can include a set of columns with each column having a particular type of data. As another example, a table can have a row orientation rather than a columnar orientation. For a columnar table, the table can include a header that includes a label for each column that describes the content of cells in the column. Non-header cells of the table can include data cells and also derived cells which can, for example, include a value that is an aggregate of a set of data cells.

SUMMARY

The present disclosure involves systems, software, and computer implemented methods for automatically identifying table locations and table cell types of located tables. One example method includes: receiving a request to detect tables in an input spreadsheet; extracting features from each cell in at least one worksheet of the input spreadsheet; providing the input spreadsheet and the extracted features to a trained table detection model trained to automatically predict whether worksheet cells are table cells or background cells and to a cell classification model that is trained to automatically classify worksheet cells by cell structure type; automatically generating, by the trained table detection model and for each respective cell in each worksheet of the input spreadsheet, a binary classification that indicates whether the cell is a table cell or a background cell; performing a contour detection process on the binary classifications to generate table location information that describes at least one table boundary of at least one table included in the input spreadsheet; automatically generating, by the trained cell classification model, a cell structure type classification for each cell that is included in a table boundary generated by the contour detection process; and providing the table location information and the cell structure type classifications in response to the request.

Implementations may include one or more of the following features. Cell structure types can include header, data, derived, and group header cell structure types. The trained table detection model can be a first random forest model. The trained cell classification model can be a second random forest model. The trained table detection model can be a U-Net model. First feedback regarding the table location information can be received and the table detection model can be updated based on the first feedback. Second feedback can be received regarding the cell structure type classifications and the cell classification model can be updated based on the second feedback. The table detection model and the cell classification model can be trained using a set of training worksheets and tested using a set of testing worksheets. The table detection model and the cell classification model can be trained using annotations for the set of training worksheets.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 4A is a visualization of example annotations for an example spreadsheet.

FIG. 4B illustrates an example annotation file.

FIG. 5 illustrates example features.

FIG. 9 illustrates example table detection model output.

FIG. 10B illustrates an annotated spreadsheet visualization.

DETAILED DESCRIPTION

Figure 1:
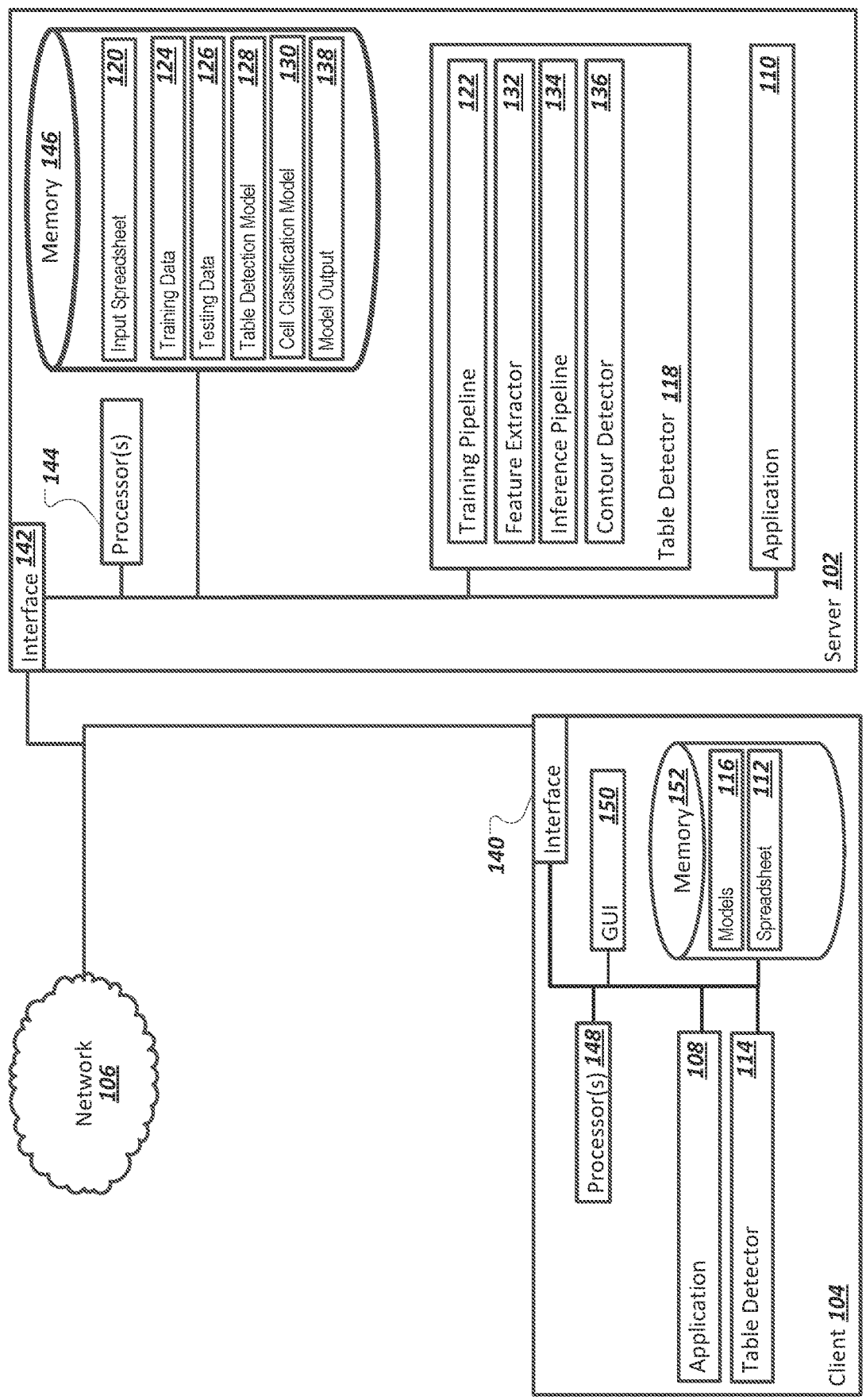
FIG. 1 is a block diagram illustrating an example system for automatically identifying table locations and table cell types of located tables.

Some applications can utilize a substantial amount of input data. For instance, a sourcing system can create sourcing events using input data that includes line item information. The sourcing system may include a user interface that enables a user to enter line item information for sourcing events. However, manually entering line item information can be time consuming. Additionally, a user may already have line item information in a RFQ (Request for Quote) or RFP (Request for Proposal) document, such as a spreadsheet file. The sourcing application can include a feature that enables a user to import a document. A table detector that is included in or used by the sourcing application can identify tables of information in the imported document that may be of use to the sourcing application. After tables are identified, the sourcing application can perform semantic analysis to determine whether identified tables include information that is of interest to the application.

Automatic import of table-based data can save user time and can also reduce use of computing resources. For example, manual entry of substantial amounts of input data can result in physical wear on computing devices such as keyboards, pointing devices, etc. Additionally, when a user spend substantial time manually entering data, the sourcing application must dedicate processing time to accept and store substantial amounts of manual user input. Automatic import, which can be performed in a fraction of time that may be needed for manual input, can free the sourcing application and the computing device(s) on which the sourcing application runs for other tasks. Automatic import can also enable the sourcing application to receive and use a larger amount of input data, since the convenience of table import may mean that users decide to provide input data that they might otherwise skip providing if manual input was an only input option. With automatic import, the user can provide more complex information to a sourcing application, which can result in a more complex (and more accurate) set of bid points or requirements for creation of sourcing events.

Although import of table data can save time and resources, table identification can be challenging, because a given worksheet may have multiple tables and a spreadsheet document may have multiple worksheets. Additionally, table identification can be challenging because different tables can be of different sizes, may be in different locations within a spreadsheet, can be formatted differently, may include merged cells that are merged either horizontally or vertically, and/or may have different orientations (e.g., column wise or row wise). To solve challenges of table identification and to identify tables more accurately than other approaches, the table detector can use a ML (Machine Learning) system to automatically identify tables in a document.

The ML system can use an end-to-end approach that includes automatic table detection and analyzing of data structures within identified tables. For example, the ML system can identify multiple tables within a worksheet and determine precise table boundaries of each identified table. For each table, the ML system can classify each table cell by cell type (e.g., header, group (e.g., section) header, data, or derived (e.g., formula)). The ML system can identify multiple tables in one or more worksheets of a spreadsheet document. The ML system can successfully identify tables even when the spreadsheet document includes complex formatting or structure such as merged cells or different table orientations. The ML system can provide an innovated method for table identification, spreadsheet document handling that can also be applied to other structured documents or data sets.

FIG. 1 is a block diagram illustrating an example system 100 for automatically identifying table locations and table cell types of located tables. Specifically, the illustrated system 100 includes or is communicably coupled with a server 102, a client device 104, and a network 106. Although shown separately, in some implementations, functionality of two or more systems or servers may be provided by a single system or server. In some implementations, the functionality of one illustrated system or server may be provided by multiple systems or servers.

A user can use a client application 108 on the client device 104. The client application 108 can be a client side version of a server application 110. The client application 108 and the server application 110 can be client and server versions of a sourcing application, respectively, for example. The client application 108 can enable a user to specify an input spreadsheet 112 that includes tabular information (e.g., line item information) that can be used as input information for the client application 108. The client application 108 can include or use a table detector 114 that can automatically detect tables based on a set of machine learning models 116.

As another example, the client application 108 can forward a request for table detection to the server application 110. The server application 110 can include or use a table detector 118 to automatically detect table(s) in an input spreadsheet 120. The input spreadsheet 120 can be uploaded to the server 102, for example, from the client device 104. Further descriptions of the table detector 118 can apply to the table detector 114 on the client device 104. That is, table detector functionality described herein can be implemented as a server-based and/or a client-based component. Additionally, although being described as included in or used by the client application 108 and/or the server application 110, a standalone table detector application can be provided that can accept requests for detecting table(s) in an input spreadsheet.

The table detector 118 can include a training pipeline 122. The training pipeline 122 can include using training data 124 and testing data 126 to train a table detection model 128 and a cell classification model 130. The training pipeline 122 can include operations to train the table detection model 128 to automatically predict whether worksheet cells are table cells or background cells, based on features of spreadsheet cells in the training data 124 that are extracted using a feature extractor 132 and based on ground truth annotations in or otherwise associated with the training data 124. The training pipeline 122 can also include operations to train the cell classification model 130 to automatically classify worksheet cells by cell structure type, based on the features of spreadsheet cells in the training data 124 and the ground truth annotations.

In response to receiving a request to detect tables in the input spreadsheet 120, the table detector 118 can initiate an inference pipeline 134. The inference pipeline 134 can include extracting, by the feature extractor 132, features from each cell in each worksheet of the input spreadsheet 120. The input spreadsheet 120 and the extracted features can be provided the table detection model 128 and the cell classification model 130.

The table detection model 128 can automatically generate, for each respective cell in each worksheet of the input spreadsheet 120, a binary classification that indicates whether the cell is a table cell or a background cell. The inference pipeline 134 can include using a contour detector 136 to perform a contour detection process on the binary classifications to generate table location information that describes table boundaries of table(s) that included in the input spreadsheet. The cell classification model 130 can automatically generate a cell structure type classification for each cell that is included in a table boundary generated by the contour detection process. Cell structure types can include data cell, header cell, derived (e.g., formula) cell, and other cell types, as described in more detail below. The table detector 118 can generate model output 138 that includes the table location information and the cell structure type classifications. The table detector 118 (or the server application 110 or the client application 108, as appropriate) can provide the model output 138 in response to the request to detect tables in the input spreadsheet 120.

As used in the present disclosure, the term "computer" is intended to encompass any suitable processing device. For example, although FIG. 1 illustrates a single server 102, and a single client device 104, the system 100 can be implemented using a single, stand-alone computing device, two or more servers 102, or two or more client devices 104. Indeed, the server 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client device 104 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 140 and 142 are used by the client device 104 and the server 102, respectively, for communicating with other systems in a distributed environment—including within the system 100—connected to the network 106. Generally, the interfaces 140 and 142 each comprise logic encoded in software and/or hardware in a suitable combination and operable to communicate with the network 106. More specifically, the interfaces 140 and 142 may each comprise software supporting one or more communication protocols associated with communications such that the network 106 or interface's hardware is operable to communicate physical signals within and outside of the illustrated system 100.

The server 102 includes one or more processors 144. Each processor 144 may be a central processing unit (CPU), a blade, an application specific integrated circuit (ASIC), a field-programmable gate array (FPGA), or another suitable component. Generally, each processor 144 executes instructions and manipulates data to perform the operations of the server 102. Specifically, each processor 144 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 146. In some implementations, the server 102 includes multiple memories. The memory 146 may include any type of memory or database module and may take the form of volatile and/or non-volatile memory including, without limitation, magnetic media, optical media, random access memory (RAM), read-only memory (ROM), removable media, or any other suitable local or remote memory component. The memory 146 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The client device 104 may generally be any computing device operable to connect to or communicate with the server 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the client application 108. A client application is any type of application that allows the client device 104 to request and view content on the client device 104. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 further includes one or more processors 148. Each processor 148 included in the client device 104 may be a central processing unit (CPU), an application specific integrated circuit (ASIC), a field-programmable gate array (FPGA), or another suitable component. Generally, each processor 148 included in the client device 104 executes instructions and manipulates data to perform the operations of the client device 104. Specifically, each processor 148 included in the client device 104 executes the functionality required to send requests to the server 102 and to receive and process responses from the server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a GUI 150.

The GUI 150 of the client device 104 interfaces with at least a portion of the system 100 for any suitable purpose, including generating a visual representation of the modeling application 108. In particular, the GUI 150 may be used to view and navigate the model 110, various Web pages, or other user interfaces. Generally, the GUI 150 provides the user with an efficient and user-friendly presentation of business data provided by or communicated within the system. The GUI 150 may comprise a plurality of customizable frames or views having interactive fields, pull-down lists, and buttons operated by the user. The GUI 150 contemplates any suitable graphical user interface, such as a combination of a generic web browser, intelligent engine, and command line interface (CLI) that processes information and efficiently presents the results to the user visually.

Memory 152 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 152 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
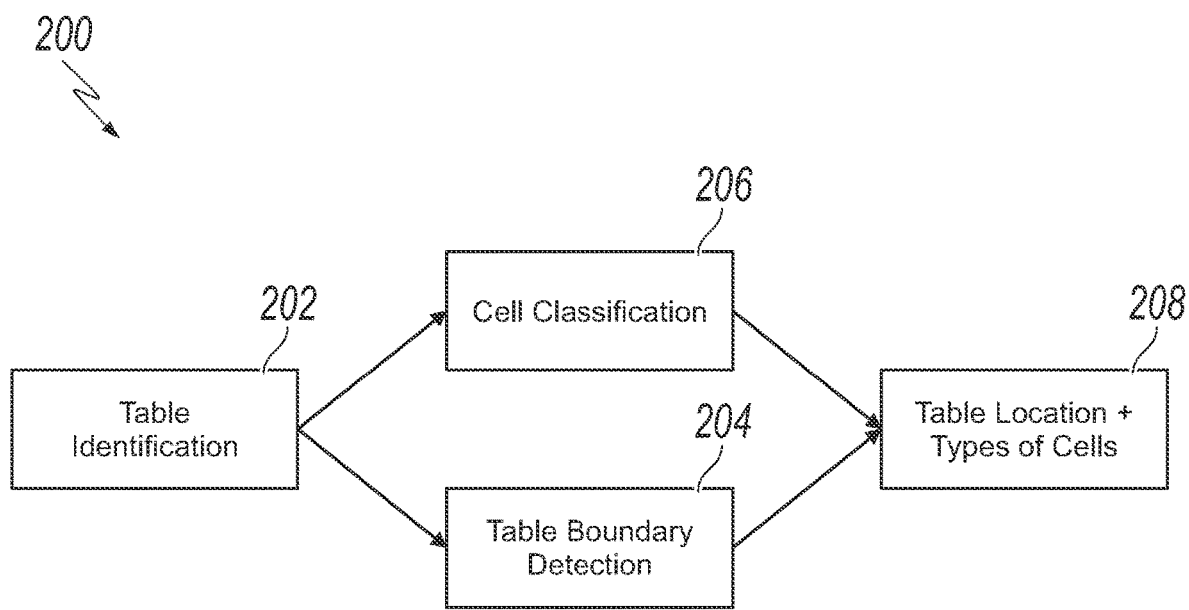
FIG. 2 illustrates an example system for automatic table identification.

FIG. 2 illustrates an example system 200 for automatic table identification. A table identification process 202 can include a table boundary detection process 204 and a cell classification process 206. The table boundary detection process 204 can include automatic identification of table boundaries of one or more tables that are included in a spreadsheet. The cell classification process 206 can include automatic classification of each cell included within the table boundary identified by the table boundary detection process 204. As described in more detail below, cell types can include header cells, data cells, derived cells, and other types of cells. An overall output 208 of the table identification process 202 can include table location (and table size, as reflected by the table boundary identified by the table boundary detection process 204) and cell type classification for each table cell.

Figure 3:
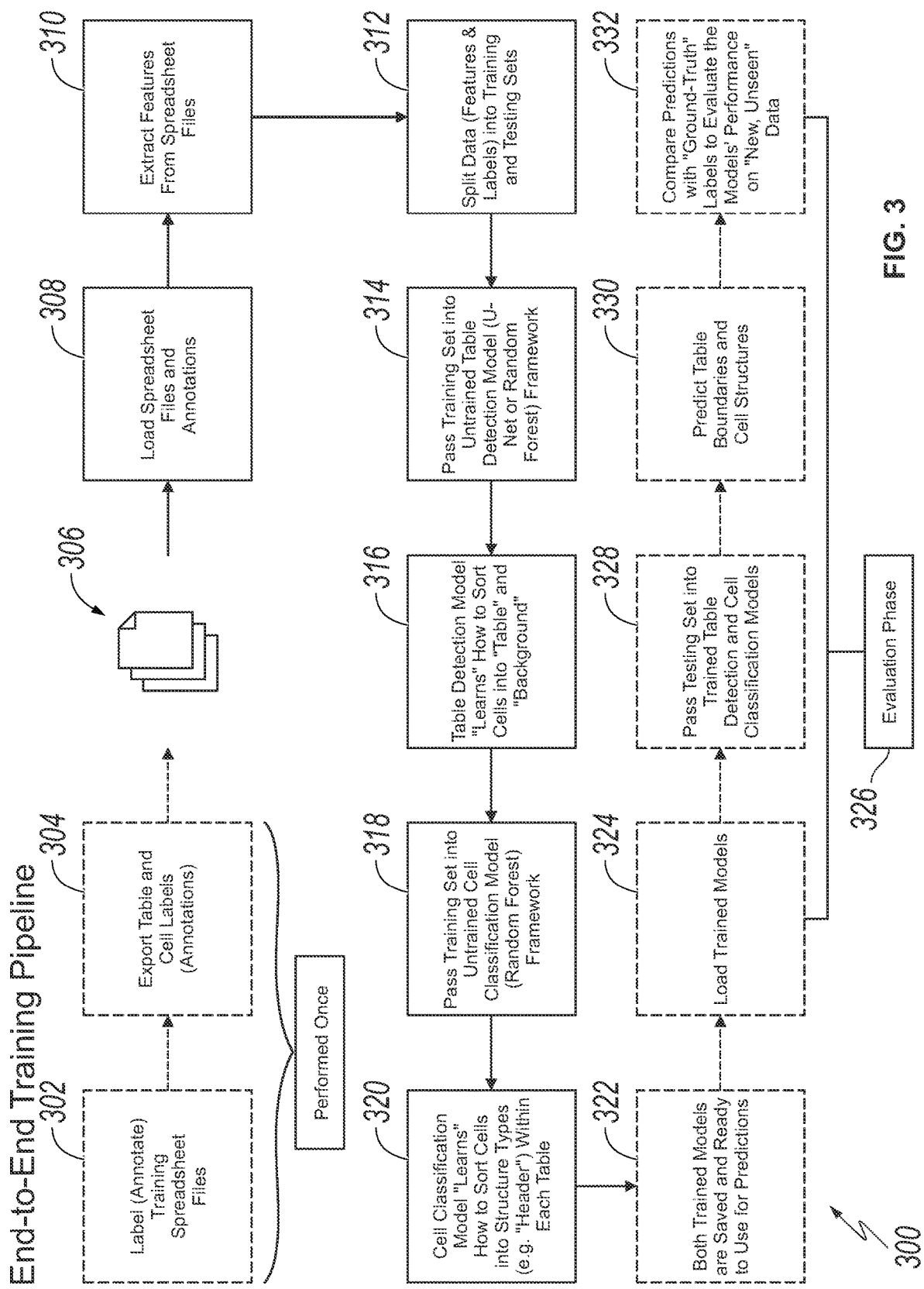
FIG. 3 illustrates an example training pipeline for training one or more table identification machine learning models.

FIG. 3 illustrates an example training pipeline 300 for training one or more table identification machine learning models. At 302, each spreadsheet file in a set of spreadsheet files is labeled by providing annotations that identify tables in the spreadsheet file and cell types of cells included in the identified tables. The annotations can include ground truth data that marks or identifies known table locations and known cell types in the spreadsheet files. In some implementations, annotations can be provided within a spreadsheet file editor. As another example, annotations can be entered in a separate annotations file.

Figure 4A:
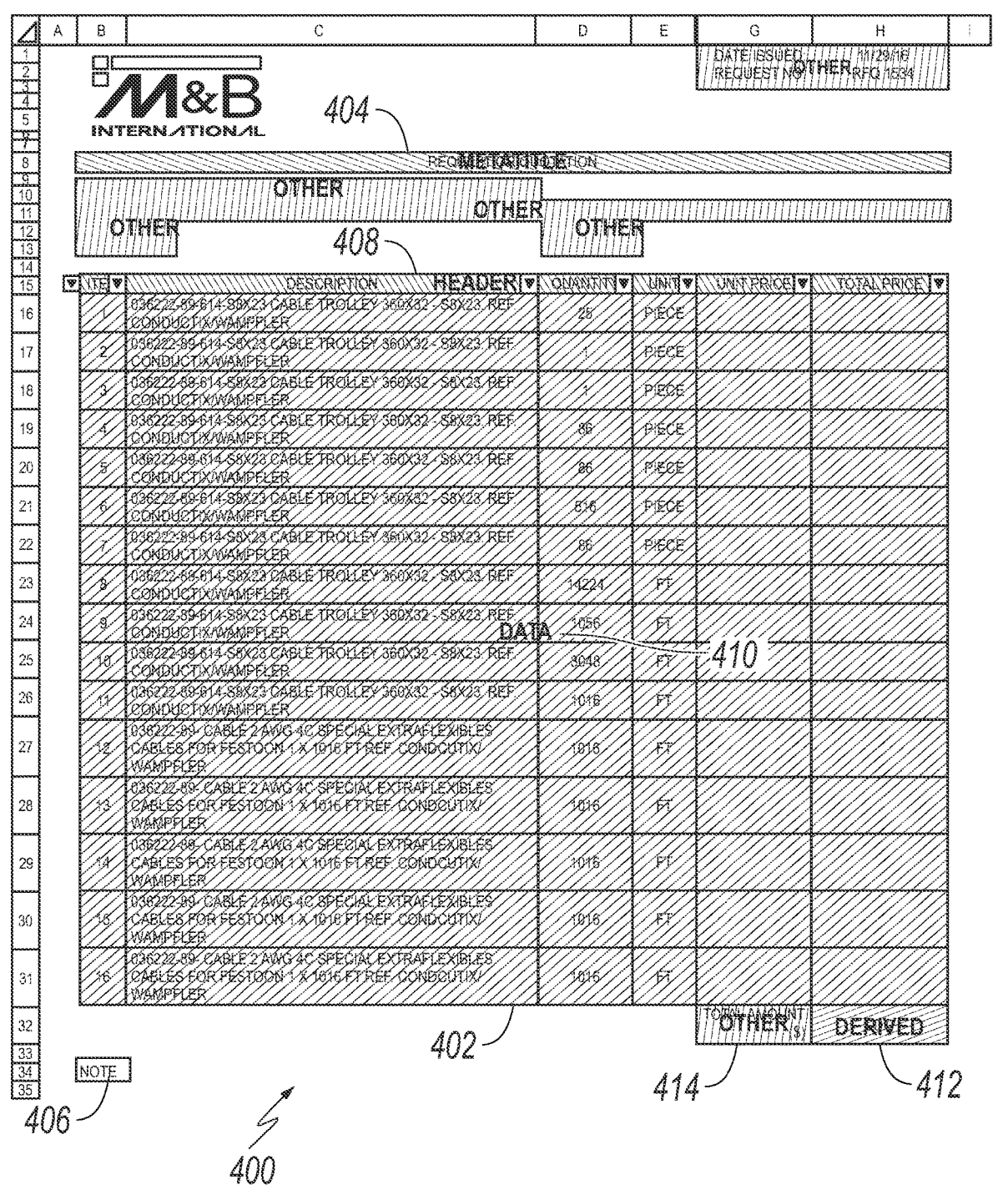

FIG. 4A is a visualization 400 of example annotations for an example spreadsheet. A border 402 visualizes a boundary of a known table in the example spreadsheet. Some annotations label table items that are inside of an identified table, and other annotations label table-related items that are outside of a table boundary. For example, a meta-title annotation 404 identifies a table name of the known table that is outside of the table boundary. As another example, a note annotation 406 labels a note item that is also outside of the known table. A header annotation 408 labels a header of the known table. A header can include names for columns that are included in the known table. A data annotation 410 labels a group of data cells that are included in the known table. Data cells provide a main payload of data for a table. When a table includes a header, data cells follow a structure defined by the header. A derived annotation 412 labels a total cell included in the known table. Derived cells can be aggregations (e.g., sum, product, average, etc.) of data cells, and may be included inside or outside of a table. A group header is another type of annotation that can be used to label headers that may define a hierarchical structure on the left (or right) side of a table. Table items that have not been labeled using one of the predefined labels or annotations described above can be annotated using an "other" label. For example, an other-annotation 414 labels a text item that is outside of the known table.

The visualization 400 illustrates annotations for a spreadsheet overlaid on top of spreadsheet cells. In some implementations, a spreadsheet editor can be modified to enable a user to select annotations for cells in a spreadsheet file. While the visualization 400 illustrates annotations for a spreadsheet overlaid on top of spreadsheet cells, annotations that are provided as training data to a machine learning model can be stored in an annotation file. For example, the spreadsheet editor can enable a user to export annotations that have been selected by a user using the spreadsheet editor to an annotations file.

FIG. 4B illustrates an example annotation file 450. The annotation file 450 can have a table format with each row including information for a particular annotated item and each column including values for a particular type of annotation attribute. For example, the annotation file 450 includes a file name column 452, a sheet name column 454, an annotation type column 456, and annotated item location columns 458. The annotated item location columns 458 can define, for example, an upper left corner and a lower right corner of an annotated item, with row and column number counting starting at zero.

As an example, a row 460 in the annotation file 450 specifies that a "Sheet1" sheet in a "Spreadsheet1" spreadsheet file has a table with an upper-left corner of row 2, column 1 and a lower right corner of row 13, column 2. A row 462 in the annotation file 450 specifies that a meta-title of the table occupies a range of cells starting at row 0, column 0 and ending at row 0, column 1. A row 464 in the annotation file 450 specifies that a header of the table occupies a range of cells starting at row 2, column 1 and ending at row 2, column 2. A row 466 in the annotation file 450 specifies that the table has a data cell area with an upper left corner of row 3, column 1 and a lower right corner of row 13, column 2. The annotation file 450 can be provided to a machine learning model as training data, as described below. Although the annotation file 450 includes annotations for one table included in one spreadsheet file, an annotation file can include data for multiple tables within a given spreadsheet and/or multiple tables included in multiple spreadsheet files. Additionally, multiple annotation files can be provided to the machine learning model.

Referring again to FIG. 3, at 304, table and cell annotations are exported. For example, when annotations are provided in a spreadsheet file editor, annotations for spreadsheet file(s) can be exported to respective annotation files 306.

At 308, the spreadsheet files and corresponding annotations are loaded into a data preprocessing pipeline to transform the spreadsheet files and corresponding annotations into a format for consumption by machine learning models.

At 310, features are extracted from the loaded spreadsheet files. Traditional image processing models can use input features based on color channel information. For example, for color images, each pixel can have a red, green, and blue color value. Grayscale images may only have one color value. Rather than use only limited color channel information, the table identifier system described herein can use additional features that are available as properties of cells in spreadsheet files. The table identifier can be trained and adapted to use a feature set that includes a number of other features other than color. In summary, features that can be extracted for cells from spreadsheet files can include additional features relating to data format, formulas, and other features, as well as color-based features such as font color and fill color. These additional features can be leveraged and used by the machine learning model, which can result in improved table identification based on machine learning that uses more features as compared to standard image processing models that can be used, for example, if a spreadsheet was converted into an image file. Additional example extracted features are discussed below.

FIG. 5 illustrates example features 500. The features 500 can apply to a given cell in a spreadsheet file, for example. A feature 502 indicates a sheet index of a sheet that includes the cell. Features 504 and 506 specify a row reference and a column reference of the cell, respectively. Feature 508 indicates whether the cell is empty (e.g., has no content). Feature 510 specifies how many characters of data are included in the cell. Features 512, 514, and 516 respectively indicate whether the cell includes a numeric value, a date value, or a formula. Features 518 and 520 respectively indicate a proportion of digits or letters in the cell content. Features 522 and 524 respectively indicate whether the cell content includes a percent symbol or a decimal point. Features 526, 528, and 530 respectively indicate red, green, and blue color values for the foreground color of the cell. Similarly, features 532, 534, and 536 respectively indicate red, green, and blue color values of the font color of the cell.

Features 538, 540, 542, 544, 546, 548, 550, and 552 respectively indicate whether the cell includes bold text, has a top border, has a bottom border, has a left border, has a right border, includes a conditional value, is merged with a horizontal neighbor, or is merged with a vertical neighbor. A feature 554 indicates how many tokens (e.g., words or other portions delimited by a delimiter) are included in the cell content. A feature 556 indicates how many leading spaces are included in the cell content (if any). Features 558, 560, 562, 564, 566, 568, and 570 respectively indicate whether the cell content starts with a number, starts with a predefined special character, is title case, is upper case, includes only alphabetic characters, includes any predefined special characters, or includes a colon character.

Features 572 and 574 respectively indicate whether the cell content includes a word similar to "total" or "table". For example, the features 572 and 574 can have a true value if the cell content includes the word "total" or "table" or a word synonymous with or otherwise corresponding to "total" or "table", respectively.

Feature 576 provides information on indentation for the cell. For example, in some implementations, the feature 576 indicates whether cell content is indented. In other implementations, the feature 576 (or another feature) can indicate a level of indentation of cell content (e.g., number of spaces, number of tab stops or tab characters of indentation).

Features 578, 580, and 582 indicate whether the cell has default (e.g., left or right) horizontal alignment, center horizontal alignment, or bottom vertical alignment, respectively. Feature 584 indicates whether the cell content is wrapped. Feature 586 indicates a cell count (e.g., if the cell is a merging of other cells). Features 588 and 590 indicate whether the cell has a thin top border or a medium right border, respectively. Feature 591 specifies a count of defined borders for the cell (e.g., 0, 1, 2, 3, or 4).

Feature 592 indicates a font size of cell content for the cell. Feature 593 indicates whether a single underline style is used for the cell. Features 594, 595, 596, 597, and 598 indicate whether the cell has 0, 1, 2, 3, or 4 neighbor cells (e.g., where a neighbor cell is an adjacent cell that is not empty).

Referring again to FIG. 3, at 312, the loaded spreadsheet files and corresponding extracted features are split into a training set and a testing set. For example, a first portion of the spreadsheet files (or worksheets) can be used as a training set and a second portion of the spreadsheet files (or worksheets) can be reserved for a testing set.

At 314, the training set is provided to an untrained table detection model. The untrained table detection model can be an untrained random forest model or an untrained U-Net model, for example.

At 316, the untrained table detection model is trained using the training set to generate a trained table detection model that is configured to sort input table cells into table and background cells. For example, based on the annotations and the extracted features for the training set, the table detection model can learn which types of cell features correspond to table cells or background cells. As such, the trained table detection model is a binary classification model.

As mentioned, the table detection model can be a U-Net model. A U-Net model is a fully convolutional network and a U-Net architecture can include trainable layers that can gradually resize a convoluted image back to its original dimensions. A contracting (convolutional) path can capture regional context (e.g., zooming out). An expanding (deconvolutional/transpose convolutional) path can return precise locations by increasing the resolution of the output. A U-Net model can require less training than other models.

At 318, the training set is provided to an untrained cell classification model. The untrained cell classification model can be an untrained random forest model, for example. The untrained cell classification model and the untrained table detection models can be different untrained random forest models, for example.

At 320, the cell classification model is trained using the training set to generate a trained cell classification model that is configured to sort input cells into different cell structure types (e.g., header, data, derived, etc.). The cell classification model can be trained based on the features that have been extracted for each cell of the training set and the annotations for the training set. In particular, the trained cell classification model can be a multi-class classification model that is trained on cells within ground truth table boundaries specified by the annotations for the training set. Training the cell classification model can include using an ensemble learning method that reduces correlation between tree models with bagging and selecting a random subset of features for tree splitting.

At 322, each of the trained cell classification model and the trained table detection model are saved. At 324, each of the trained cell classification model and the trained table detection model are loaded and enabled to classify input cells. For example, at 328 in an evaluation phase 326, the testing set is provided to each of the trained table detection model and the trained cell classification model. At 330, the trained table detection model generates predictions by classifying cells in the testing set as either table cells or background cells and the trained cell classification model generates predictions by classifying cells in the testing set according to cell structure type (e.g., header, data, derived).

At 332, the predictions generated by the trained table detection model and the trained cell classification model are compared to ground truth labels in the testing set to generate performance metrics for the trained table detection model and the trained cell classification model. The trained table detection model and the trained cell classification model can be each be tuned based on the comparisons (e.g., each of the trained table detection model and the trained cell classification model can be tuned by providing feedback regarding accurate and inaccurate predictions). Tuning the table detection model and the trained classification model can include determining which cell features are most important and/or result in most accurate predictions as compared to other cell features. Different weights for cell features can be configured in the table detection model and/or the cell classification model based on determined feature importance levels.

The training pipeline 300 can be repeated (e.g., using different training and/or testing sets) until an acceptable performance is achieved. Once the training pipeline 300 is completed, the trained table detection model and the trained cell classification model can be used, during inference, for input spreadsheet files other than those used for training and testing.

Figure 6:
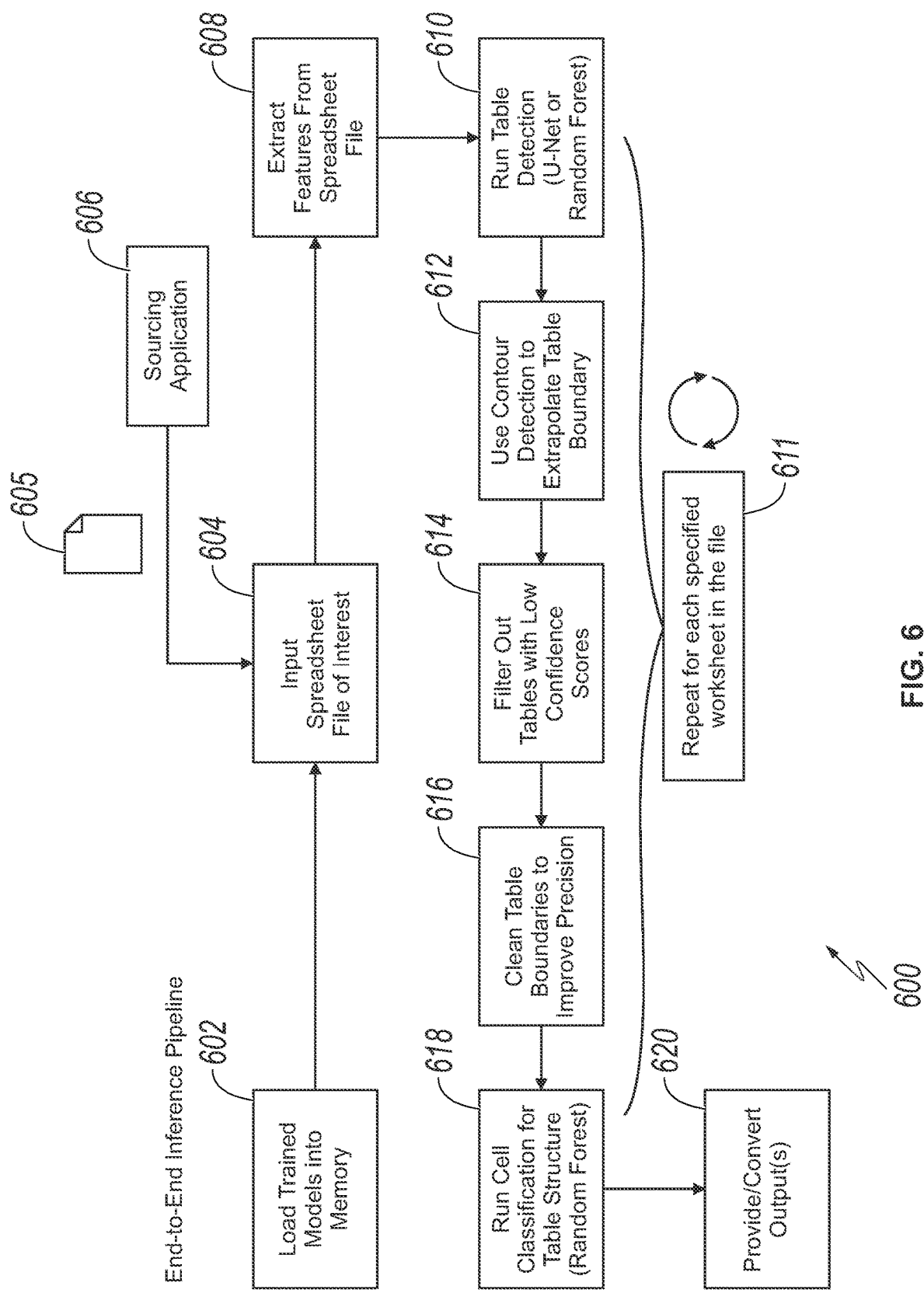
FIG. 6 illustrates an example inference pipeline.

FIG. 6 illustrates an example inference pipeline 600. At 602, a trained table detection model and a trained cell classification model (e.g., collectively the trained models) are loaded into memory (e.g., to be available for use by one or more clients). At 604, an input spreadsheet file 605 is provided as input to the trained models. For example, the trained models can be used by an application (e.g., a sourcing application 606) to detect table(s) in the input spreadsheet file 605. A user can use an interface of the sourcing application 606, for example, to select and upload the input spreadsheet file 605.

At 608, features are extracted from the input spreadsheet file 605. For example, features such as the features 500 described above with respect to FIG. 5 can be extracted. At 610, the extracted features are provided to the trained table detection model. The trained table detection model can classify each cell of the input spreadsheet file 605 as either a table cell or a background cell. The trained table detection model can determine a probability of each cell being part of a table, for example. As indicated by a note 611, operation 610 and other operations can be performed for each worksheet (or each specified worksheet) in the input spreadsheet file 605.

Figure 7:
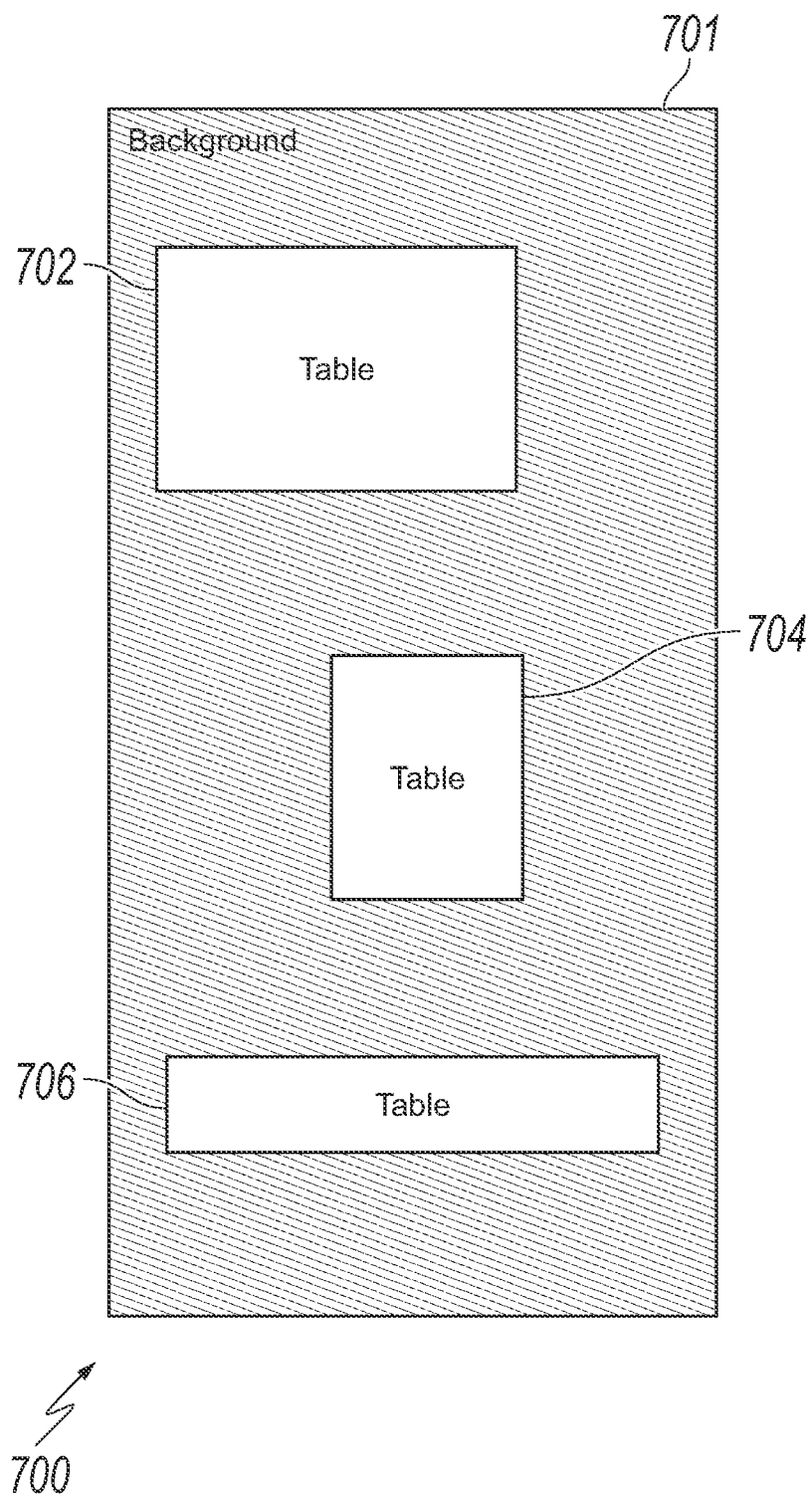
FIG. 7 is a visualization that illustrates cell classification by a table detection model.

FIG. 7 is a diagram 700 that illustrates cell classification by a table detection model. In the diagram 700, a colored cell background, such as used for cells in an area 701, illustrates that a table cell can be identified by the table detection model as a background cell. A white cell background in the diagram 700, such as used for cells in a first table 702, a second table 704, and a third table 706, illustrates that a table cell can be identified by the table detection model as a table cell.

Referring again to FIG. 6, at 612, contour detection is performed to extrapolate boundaries of table(s) in the input spreadsheet file 605. For example, contour detection can be performed using the table cell/background cell classification output generated during operation 610. Contour detection can include grouping cells to form table boundaries and generating an aggregated confidence (e.g., probability) score for each predicted table.

Figure 8A:
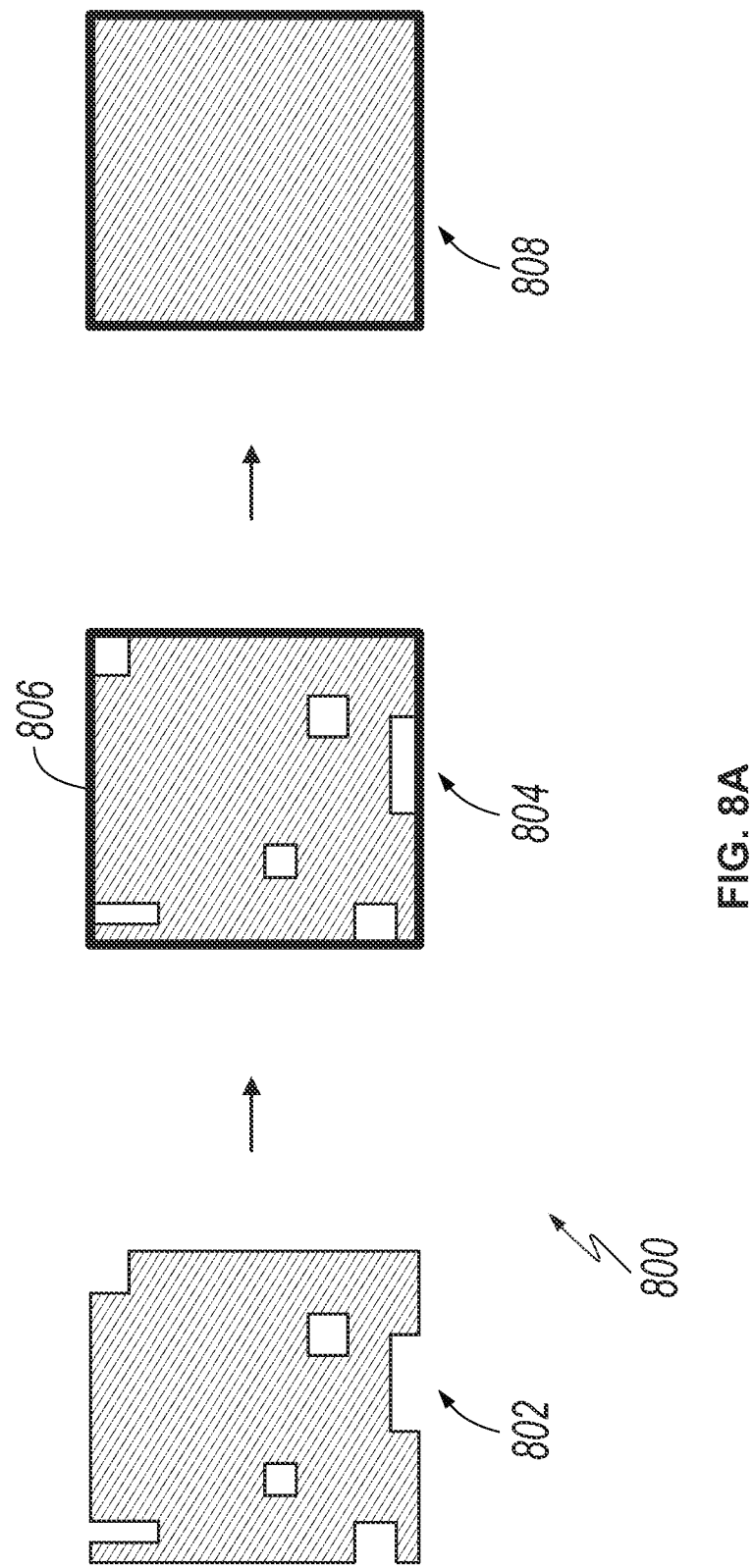
FIG. 8A is a visualization that illustrates contour detection for determining a table boundary.

FIG. 8A is a visualization 800 that illustrates contour detection for determining a table boundary. A first visualization 802 illustrates table cell/background cell classification output from a table detection model. For example, colored cells indicate cells predicted to be table cells and white cells indicate cells predicted to be background cells. A second visualization 804 illustrates a result of applying contour detection to the table cell/background cell classification output. For example, contour detection has resulted in a bounding box border 806 being determined. Contour detection can include using computer vision techniques to extrapolate the bounding box border 806 from the table cell/background cell classification information. Contour detection can include identification of a border/boundary that joins cells that have a same classification. A third visualization 808 illustrates a result of reclassifying any background cells that are enclosed by the border 806 as predicted to be table cells.

Referring again to FIG. 6, at 614, any tables that have a confidence (e.g., probability) score below a predefined threshold can be excluded from further processing. For example, the table detection model may identify a cluster of non-empty cells as a candidate table. However, if a confidence score for the candidate table is less than the predefined threshold, the cluster can be excluded from being identified as a table.

Figure 8B:
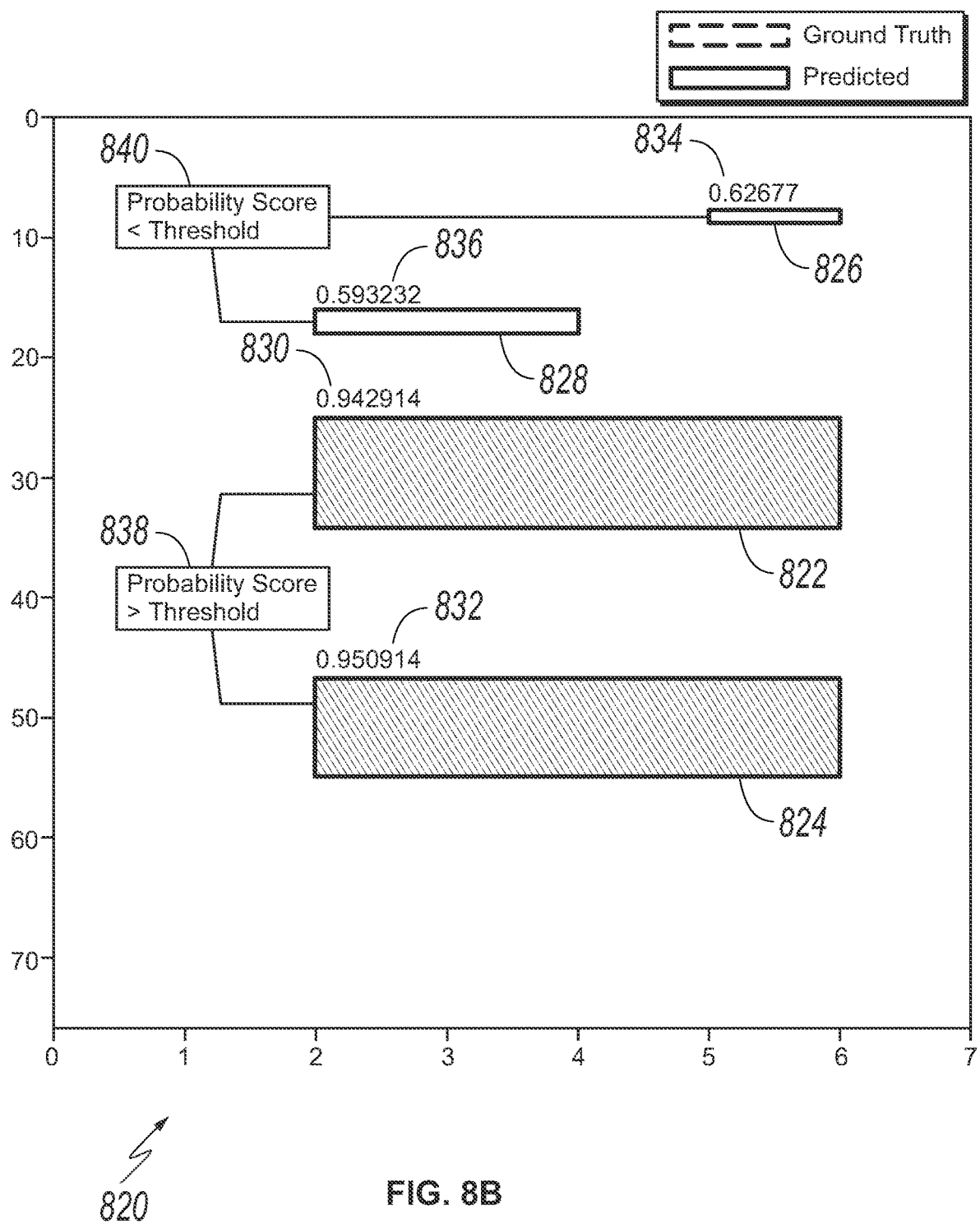
FIG. 8B is a visualization that illustrates filtering of candidate tables based on prediction scores.

FIG. 8B is a visualization 820 that illustrates filtering of candidate tables based on prediction scores. A table detection model and a contour detection process have identified candidate tables 822, 824, 826, and 828, with corresponding prediction scores 830, 832, 834, and 836. As indicated by a note 838, the candidate tables 822 and 824 can be accepted as predicted tables based on the respective prediction scores 830 and 832 being more than a predefined threshold (e.g., the predefined threshold can be 0.90). As indicated by a note 840, the candidate tables can be filtered by rejecting the candidate tables 826 and 828 as predicted tables based on the respective prediction scores 834 and 836 being less than the predefined threshold of 0.90.

Referring again to FIG. 6, table boundaries may be cleaned to improve precision at 616. For example, to correct an overestimation of table boundaries, a predicted table boundary can be adjusted by shrinking the predicted boundary to exclude any empty rows or columns within the predicted table that are located at the edge of the initial predicted boundary.

Figure 8C:
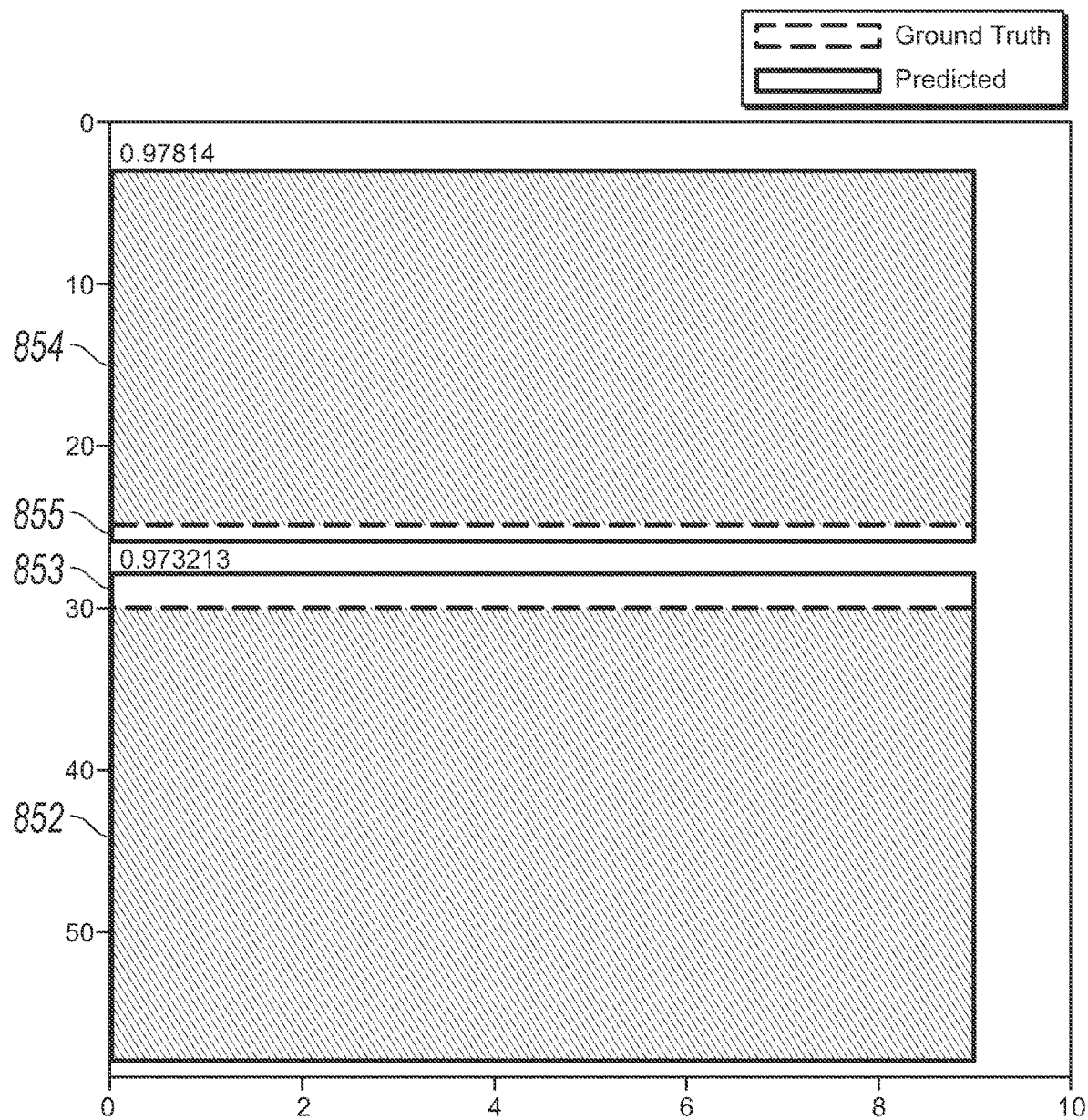
FIG. 8C is a visualization that illustrates cleaning of table boundaries.

FIG. 8C is a visualization 850 that illustrates cleaning of table boundaries. A table detection model and a contour detection process have identified predicted tables 852 and 854. The predicted table 852 has two empty rows at the top of the predicted table 852. Similarly, the predicted table 854 has an empty row 855 at the bottom of the predicted table 854. A table boundary cleaning process can identify and remove from the predicted table 852 the two empty rows 853 at the top of the predicted table 852. Similarly, the table boundary cleaning process can identify and remove from the predicted table 854 the empty row 855 at the top of the predicted table 852.

Referring again to FIG. 6, at 618, a trained cell classification model is applied to determine cell structure types for each cell of each identified table in the input spreadsheet file 605. The trained cell classification model can be a random forest model. The cell classification model can use a non-parametric method for supervised classification to predict a cell structure type for each cell in the input spreadsheet file 605. Cell structure types can include data, header, group header, meta-title, derived, or "other". Cell classification can include using predetermined cell feature importance that was determined during the training pipeline described above.

At 620, output from the table detection model and the cell classification model can be provided and/or converted to a different format. The output from the trained models indicates table location(s) and cell-type information for the input spreadsheet 605. As an example, output from the trained models can be converted to a JSON (JavaScript Object Notation) format or another format. As another example, output from the trained models can be used in one or more visualizations. As yet another example, output from the trained models can be provided to the sourcing application 606 or another application or system.

FIG. 9 illustrates example table detection model output 900. The table detection model output 900 can be in a JSON format or some other type of format. The table detection model output 900 is obtained after providing a spreadsheet file 902 to trained machine learning models. A confidence score 904 indicates a degree of confidence in the output 900. Although a single confidence score is shown, multiple confidence scores can be determined and included in the table detection output. For example, each cell can have one or more confidence scores that separately or collectively indicate a confidence in the cell being in a table and of a certain cell structure type.

The table detection model output 900 includes table boundary information 906 that predicts a boundary of a table in the spreadsheet file 902. The table detection model output 900 includes data cell location information 908, derived cell location information 910, and header cell location information 912 that indicates locations of predicted data, derived, and header cells, respectively.

Figure 10A:
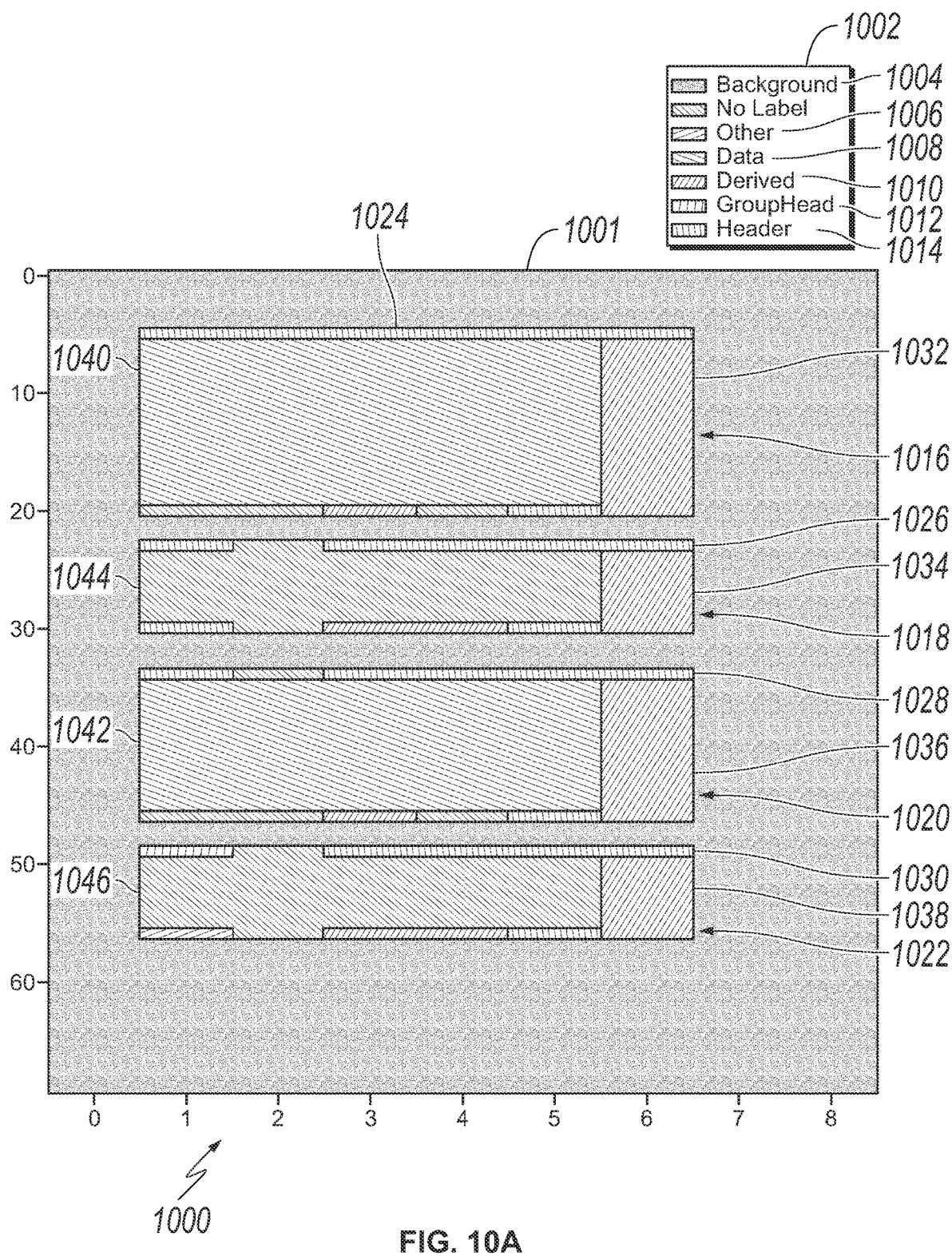
FIG. 10A illustrates an example visualization of table detection model output.

FIG. 10A illustrates an example visualization 1000 of table detection model output. The visualization 1000 can be used during training, testing, or evaluation, for example, by an administrator or model developer, to review or evaluate table detection model output. In some cases and for some applications, the visualization 1000 may be provided to an end user of an application that uses the machine learning models described herein.

As indicated by a legend 1002, a first color 1004 can represent spreadsheet cells that have been classified by a table detection model as a background cell. For discussion purposes, the terms "color" and "colored" are used, but for purposes of illustration, different shadings are used herein to represent different colors. For example, the visualization 1000 includes colored cells in an area 1001 that are colored using the first color 1004. Other colors other than the first color 1004 can represent spreadsheet cells that have been classified by the table detection model as a table cell. More particularly, a second color 1006, a third color 1008, a fourth color 1010, a fifth color 1012, and a sixth color 1014, among other colors, can be used to represent a predicted other cell, data cell, derived cell, group header cell, or header cell, respectively, based on predictions from a cell classification model.

Table visualizations 1016, 1018, 1020, and 1022 illustrate tables that have been detected by the table detection model. Colored cells in the table visualizations 1016, 1018, 1020, and 1022 indicate cell structure types that have been predicted by the cell classification model. For example, header areas 1024, 1026, 1028, and 1030 that are colored using the sixth color 1014 illustrate prediction of header cells in the tables corresponding to the table visualizations 1016, 1018, 1020, and 1022, respectively. As another example, derived cell areas 1032, 1034, 1036, and 1038 that are colored using the fourth color 1010 illustrate prediction of derived cells in the tables corresponding to the table visualizations 1016, 1018, 1020, and 1022, respectively. Data cell areas 1040 and 1042 in the table visualizations 1016 and 1020, respectively, illustrate respective predictions of data cells.

Other cell areas 1044 and 1046 in the table visualizations 1018 and 1022, respectively, illustrate that the cell classification model was unable to determine whether the cells corresponding to the other cell areas 1044 and 1046 are data cells or some other type of defined cell. For example, the cells corresponding to the other cell areas 1044 and 1046, although being adjacent to respective derived cells corresponding to the derived cell areas 1034 or 1038, respectively, may be empty. Based on being empty cells, the cell classification model may have classified the cells as "Other" rather than data cells.

Figure 10B:
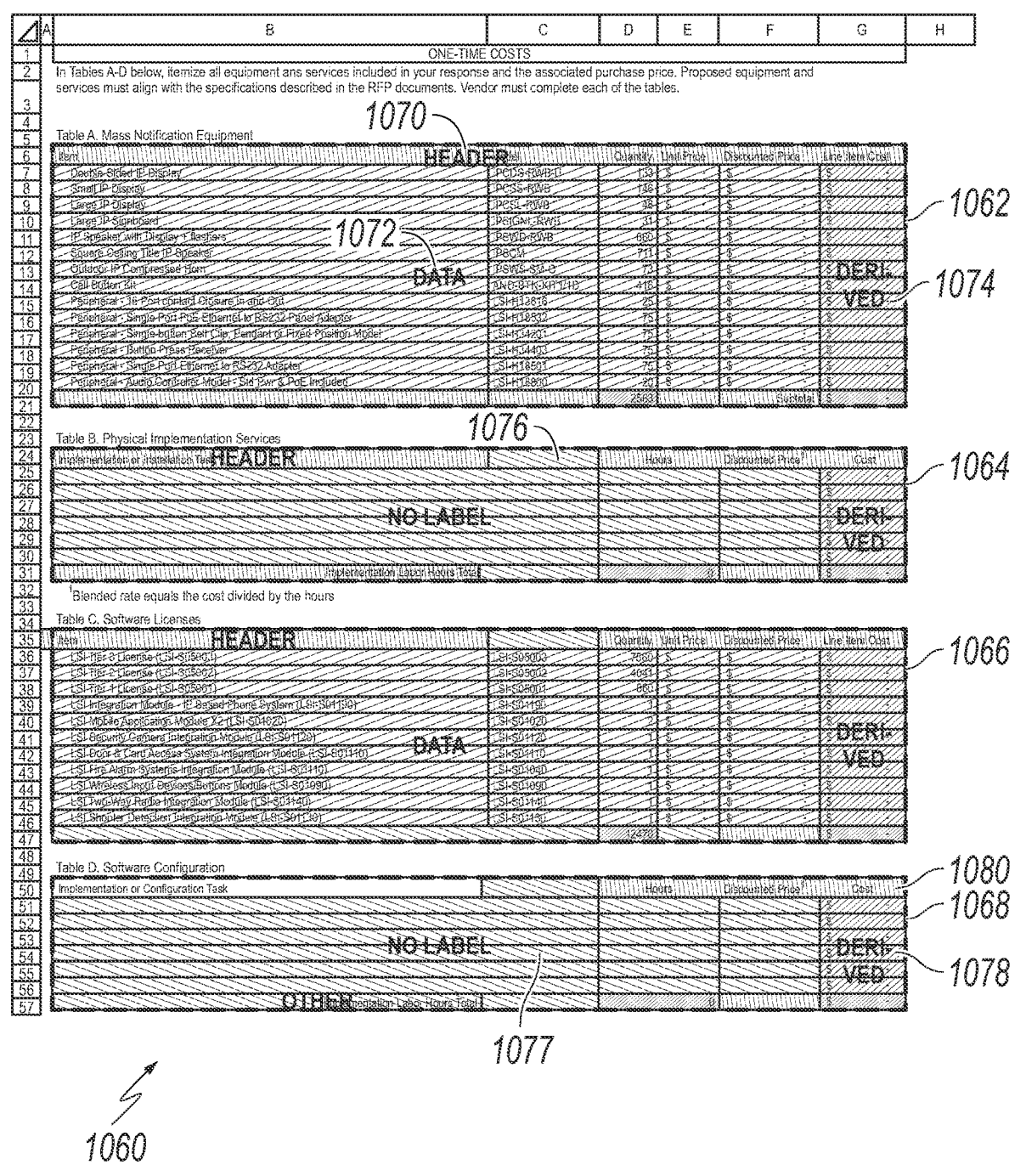

FIG. 10B illustrates an annotated spreadsheet visualization 1060 that corresponds to the visualization 1000 of FIG. 10A. The annotated spreadsheet visualization 1060 is another type of table detection model output visualization. The annotated spreadsheet visualization 1060 can present annotations that correspond to table detection model output. The annotated spreadsheet visualization 1060 includes table border visualizations 1062, 1064, 1066, and 1068 that illustrate detection by the table detection model of four tables in an input spreadsheet. The annotated spreadsheet visualization 1060 includes annotations and cell coloring to indicate classification of cells in the detected tables according to cell structure type. For example, for a first table enclosed by the table border visualization 1062, a header label 1070, a data-cell label 1072, and a derived-cell label 1074 have been presented and cells identified as header, data, or derived cells have been colored with a color corresponding to the detected cell type. Similar annotations and color have been applied for the other detected tables.

In some cases, the cell classification model may not make perfect predictions. When the cell classification model makes incorrect predictions, the incorrect predictions and corrections that address the incorrect predictions can be fed into the cell classification model to improve future predictions. Additionally or alternatively, some types of inaccurate predictions can be corrected by post-processing the model output.

For example, an empty cell 1076 in the annotated spreadsheet visualization 1060 has been colored using a color that indicates that the cell classification model classified the cell as an "other" cell, even though the empty cell 1076 is adjacent to other cells in a same row that have been identified as header cells. A correct prediction may have been to also classify the empty cell 1076 as a header row. A post-processing step can be performed in which empty cells are re-classified as header cells if the empty cell has horizontal neighbor cells that have been classified as header cells. Other post-processing rules can be applied. For example, a cell area 1077 includes unclassified cells. Based on a classification of cells 1078 to the right of the cell area 1077 being of a derived cell type and/or based on the cells in the cell area 1077 being underneath a header row 1080, the cells in the cell area 1077 can be reclassified as data cells, even though the cells in the cell area 1077 are currently empty. Although described as post-processing, such post-processing rules can also be incorporated into the cell classification model directly as part of the cell classification pipeline.

Figure 11:
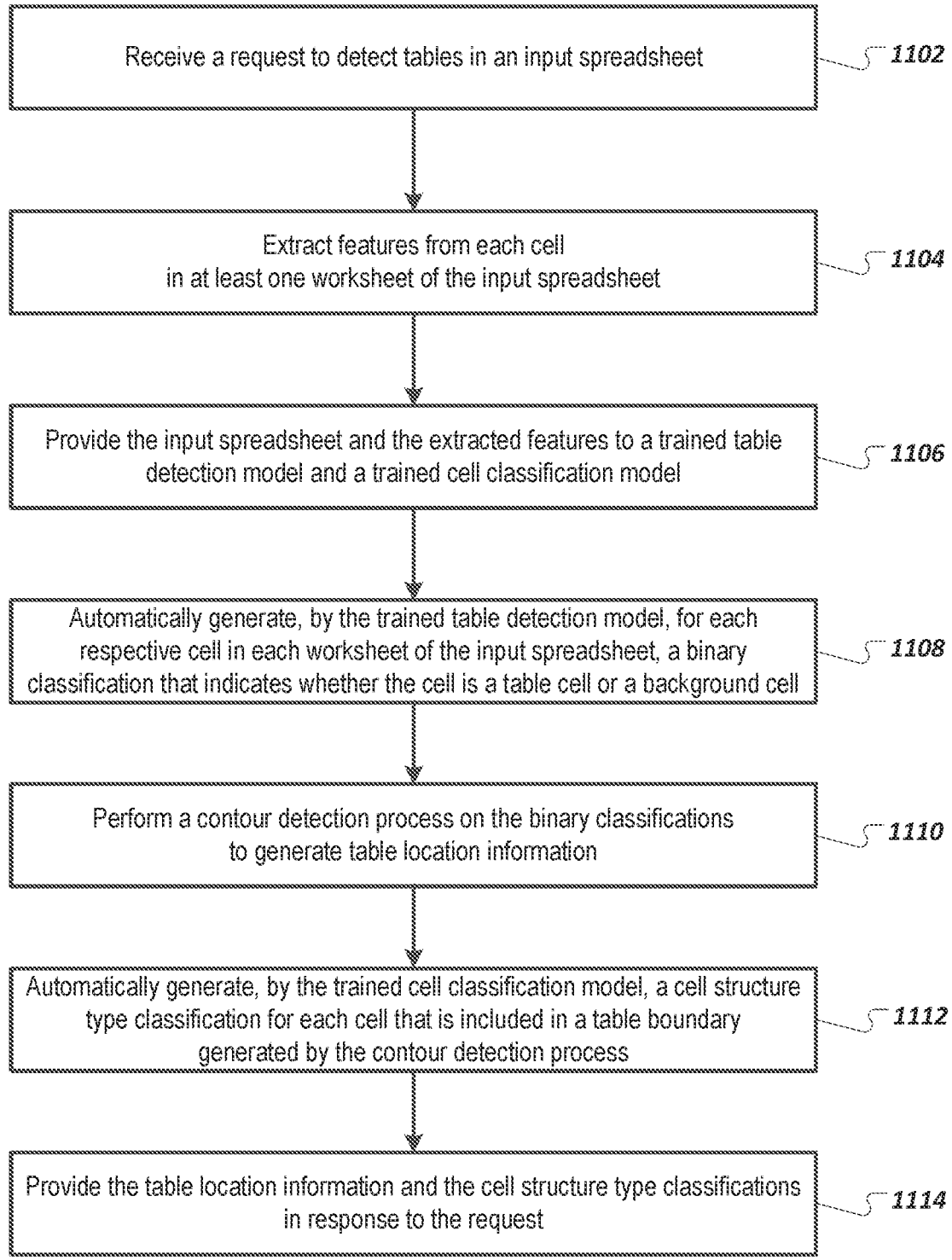
FIG. 11 is a flowchart of an example method for automatically identifying table locations and table cell types of located tables.

FIG. 11 is a flowchart of an example method 1100 for automatically identifying table locations and table cell types of located tables. It will be understood that method 1100 and related methods may be performed, for example, by any suitable system, environment, software, and hardware, or a combination of systems, environments, software, and hardware, as appropriate. For example, one or more of a client, a server, or other computing device can be used to execute method 1100 and related methods and obtain any data from the memory of a client, the server, or the other computing device. In some implementations, the method 1100 and related methods are executed by one or more components of the system 100 described above with respect to FIG. 1. For example, the method 1100 and related methods can be executed by the table detector 118 of FIG. 1.

At 1102, a request is received to detect tables in an input spreadsheet. Although a spreadsheet is described, other types of structured documents, such as delimited files, can be specified in the request.

At 1104, features are extracted from each cell in at least one worksheet of the input spreadsheet.

At 1106, the input spreadsheet and the extracted features are provided to a trained table detection model that is trained to automatically predict whether worksheet cells are table cells or background cells and to a cell classification model that is trained to automatically classify worksheet cells by cell structure type. Cell structure types can include header, data, derived, and group header cell structure types. The trained table detection model can be a first random forest model and the trained cell classification model can be a second random forest model. The trained table detection model can also be a U-Net model. In some implementations, both a random forest model and a U-Net model are trained as table detection models. The table detection model and the cell classification model can be trained using a set of training worksheets and tested using a set of testing worksheets. The set of training worksheets can have ground truth annotations.

At 1108, the trained table detection model automatically generates, for each respective cell in each worksheet of the input spreadsheet, a binary classification that indicates whether the cell is a table cell or a background cell.

At 1110, a contour detection process is performed on the binary classifications to generate table location information that describes at least one table boundary of at least one table included in the input spreadsheet.

At 1112, the trained cell classification model automatically generates a cell structure type classification for each cell that is included in a table boundary generated by the contour detection process.

At 1114, the table location information and the cell structure type classifications are provided in response to the request. Feedback can be received regarding the table location information and/or the cell structure type classifications and the table detection model and the cell classification model can be updated based on the received feedback. For example, the table detection model and the cell classification model can learn through iteration by receiving feedback on incorrect predictions and can improve predictions over time based on the feedback.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
   receiving a request to detect tables in an input spreadsheet;
   extracting features from each cell in at least one worksheet of the input spreadsheet;
   providing the input spreadsheet and the extracted features to a trained binary classification table detection model trained to automatically predict whether worksheet cells are table cells or background cells and to a trained multi-class cell classification model that is trained to automatically classify worksheet cells by cell structure type;
   automatically generating, by the trained binary classification table detection model and for each respective cell in each worksheet of the input spreadsheet, a binary table cell/background cell classification that indicates whether the cell is a table cell or a background cell;
   performing a contour detection process on the binary table cell/background cell classifications to generate table location information that describes at least one table boundary of at least one table included in the input spreadsheet, wherein performing the contour detection process comprises extrapolating the at least one table boundary by grouping cells that have a same binary table cell/background cell classification;
   automatically generating, by the trained multi-class cell classification model, a cell structure type classification for each cell that is included in a table boundary generated by the contour detection process; and
   providing the table location information and the cell structure type classifications in response to the request.

2. The computer-implemented method of claim 1, wherein cell structure types include header, data, derived, and group header cell structure types.

3. The computer-implemented method of claim 1, wherein the trained binary classification table detection model is a first random forest model.

4. The computer-implemented method of claim 3, wherein the trained multi-class cell classification model is a second random forest model.

5. The computer-implemented method of claim 1, wherein the trained binary classification table detection model is a U-Net model.

6. The computer-implemented method of claim 1, further comprising:
   receiving first feedback regarding the table location information; and
   updating the trained binary classification table detection model based on the first feedback.

7. The computer-implemented method of claim 6, further comprising:
   receiving second feedback regarding cell structure type classifications; and
   updating the trained multi-class cell classification model based on the second feedback.

8. The computer-implemented method of claim 1, wherein the trained binary classification table detection model and the trained multi-class cell classification model are trained using a set of training worksheets and tested using a set of testing worksheets.

9. The computer-implemented method of claim 8, wherein the trained binary classification table detection model and the trained multi-class cell classification model are trained using annotations for the set of training worksheets.

10. A system comprising:
one or more computers; and
a computer-readable medium coupled to the one or more computers having instructions stored thereon which, when executed by the one or more computers, cause the one or more computers to perform operations comprising:
receiving a request to detect tables in an input spreadsheet;
extracting features from each cell in at least one worksheet of the input spreadsheet;
providing the input spreadsheet and the extracted features to a trained binary classification table detection model trained to automatically predict whether worksheet cells are table cells or background cells and to a trained multi-class cell classification model that is trained to automatically classify worksheet cells by cell structure type;
automatically generating, by the trained binary classification table detection model and for each respective cell in each worksheet of the input spreadsheet, a binary table cell/background cell classification that indicates whether the cell is a table cell or a background cell;
performing a contour detection process on the binary table cell/background cell classifications to generate table location information that describes at least one table boundary of at least one table included in the input spreadsheet, wherein performing the contour detection process comprises extrapolating the at least one table boundary by grouping cells that have a same binary table cell/background cell classification;
automatically generating, by the trained multi-class cell classification model, a cell structure type classification for each cell that is included in a table boundary generated by the contour detection process; and
providing the table location information and the cell structure type classifications in response to the request.

11. The system of claim 10, wherein cell structure types include header, data, derived, and group header cell structure types.

12. The system of claim 10, wherein the trained binary classification table detection model is a first random forest model.

13. The system of claim 12, wherein the trained multi-class cell classification model is a second random forest model.

14. The system of claim 10, wherein the trained binary classification table detection model is a U-Net model.

15. The system of claim 10, wherein the operations further comprise:
receiving first feedback regarding the table location information; and
updating the trained binary classification table detection model based on the first feedback.

16. A computer program product encoded on a non-transitory storage medium, the product comprising non-transitory, computer readable instructions for causing one or more processors to perform operations comprising:
receiving a request to detect tables in an input spreadsheet;
extracting features from each cell in at least one worksheet of the input spreadsheet;
providing the input spreadsheet and the extracted features to a trained binary classification table detection model trained to automatically predict whether worksheet cells are table cells or background cells and to a trained multi-class cell classification model that is trained to automatically classify worksheet cells by cell structure type;
automatically generating, by the trained binary classification table detection model and for each respective cell in each worksheet of the input spreadsheet, a binary table cell/background cell classification that indicates whether the cell is a table cell or a background cell;
performing a contour detection process on the binary table cell/background cell classifications to generate table location information that describes at least one table boundary of at least one table included in the input spreadsheet, wherein performing the contour detection process comprises extrapolating the at least one table boundary by grouping cells that have a same binary table cell/background cell classification;
automatically generating, by the trained multi-class cell classification model, a cell structure type classification for each cell that is included in a table boundary generated by the contour detection process; and
providing the table location information and the cell structure type classifications in response to the request.

17. The computer program product of claim 16, wherein cell structure types include header, data, derived, and group header cell structure types.

18. The computer program product of claim 16, wherein the trained binary classification table detection model is a first random forest model.

19. The computer program product of claim 18, wherein the trained multi-class cell classification model is a second random forest model.

20. The computer program product of claim 16, wherein the trained binary classification table detection model is a U-Net model.

* * * * *